Patented Nov. 26, 1935

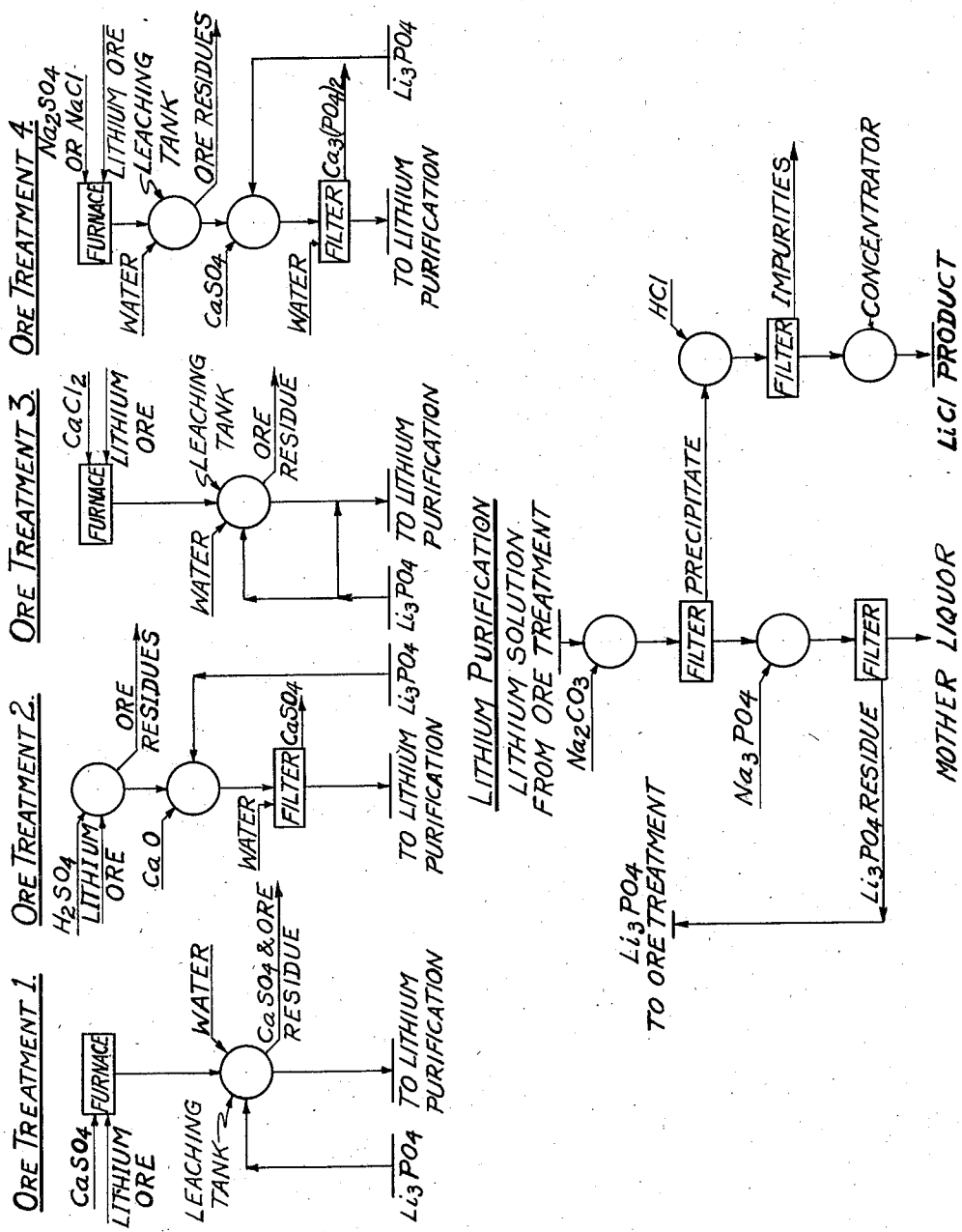

2,021,988

UNITED STATES PATENT OFFICE 2,021,988

PRODUCTION OF LITHIUM COMPOUNDS

Harry P. Corson, Lakewood, and Robert Pfanstiel, Cleveland Heights, Ohio, assignors to The Grasselli Chemical Company, Cleveland, Ohio, a corporation of Delaware Application January 20, 1934, Serial No. 707,522

8 Claims. (Cl. 23—31)

This invention relates to the production of pure lithium compounds from impure solutions of lithium compounds, such as are obtained by the treatment of lithium bearing ores and comprises: first, jointly precipitating lithium carbonate and such impurities as form precipitates with carbonate reagents; second, separating the mixed precipitates from the residual impure liquor; third, preferentially dissolving the lithium salt from the admixed impurties; and finally, recovering lithium from the impure residual liquor and returning it to the process at a point prior to the above mentioned precipitation.

The accompanying drawing shows the specific manner of procedure used in our process of purifying solutions of lithium compounds and shows four modes of ore treatment which may be used to prepare the impure solution.

In order more fully to explain our invention, we will describe a specific process using ore treatment 1 to supply the impure solution of lithium compounds for our purification process.

In ore treatment 1, as seen in the drawing, a lithium bearing ore, such a lepidolite, spodumene, etc., was calcined with calcium sulfate to convert the lithium to soluble sulfate. The soluble lithium sulfate, together with some impurities as soluble sulfates, were leached from the ore with water. This mode of extraction of lithium from ore constitutes no part of the present invention and is fully disclosed and claimed in U. S. patent application Serial No. 707,611, filed January 20, 1934, R. Pfanstiel.

To the leaching tank we added trilithium phosphate recovered at a later stage of our process. As an excess of calcium sulfate is needed in the calcining operation, there was present more than enough calcium sulfate to convert the trilithium phosphate to soluble lithium sulfate.

The lithium sulfate solution leached from the ore was then treated according to our process of purification.

The impure solution of lithium sulfate was run into a tank and there treated with sodium carbonate to jointly precipitate lithium carbonate and such of the impurities as form precipitates. The precipitate including lithium, iron, aluminum, manganese, etc. was filtered from the solution. The filtrate was collected for recovery of lithium, as noted below.

The filter cake was turned into a leaching tank and treated with hydrochloric acid to preferentially dissolve the lithium from the impurities. The acid reacts with the lithium carbonate to form lithium chloride. Care must be taken to avoid too low a pH for if the solution becomes acid, the impurities will dissolve. In our preferred procedure the pH was not allowed to go low enough to permit the dissolving of a substantial amount of the impurities present.

The lithium chloride solution was separated from the impurities by filtration, and the lithium chloride solution evaporated to dryness.

The filtrate separated from the precipitates of lithium and impurities which was collected, as above noted, for recovery of lithium, was treated with trisodium phosphate. The lithium was precipitated as trilithium phosphate, leaving sodium and potassium salts in solution. The trilithium phosphate was filtered from the solution and returned to the ore leaching tank where, as above noted, it was converted to soluble sulfates and recycled.

While we have described a specific process embodying our invention, we do not intend to be restricted or limited thereby.

Before explaining the relationship of our purification processes to other ore treating processes, we shall pause and explain the purification process more fully.

It has been proposed to treat impure solutions of lithium salts to preferentially precipitate the impurities with alkali carbonates. These impurities were then filtered from the solution and the lithium salts precipitated from the solution as carbonates. This proposal is not, however, entirely satisfactory.

We have found that by jointly precipitating the lithium and all of the impurities with a soluble carbonate a simpler and more efficient process results.

While we have specifically mentioned the use of sodium carbonate as a precipitating agent, we may use any carbonate which is more soluble than lithium carbonate, such as potassium carbonate, ammonium carbonate, etc.

When preferentially dissolving the lithium carbonate from impurities, we prefer to use hydrochloric acid, as lithium chloride is more in demand than other salts. We have found, however, that we may use any other acid which forms soluble lithium salts, such as, for example, sulfuric acid, nitric acid, acetic acid, etc.

We produce a very satisfactory product by simply evaporating the lithium salt solution to dryness. Or, if desired, the solutions of lithium chloride, lithium sulfate, etc. may be further treated to produce phosphates, fluorides, carbonates, etc. by precipitating with the corresponding sodium compound.

As lithium carbonate is slightly water soluble a rather large amount of lithium is lost when lithium is precipitated as carbonate and filtered from the solution. It has been proposed to recover this lithium carbonate which remains in solution by precipitating it as an insoluble phosphate, fluoride, etc. The insoluble lithium compound, thus recovered, then had to be specially treated to convert it to usable form.

We precipitated the lithium as phosphate to recover it, as noted in our specific example. Instead of using sodium phosphate we may, of course, use phosphoric acid or any phosphate more soluble than trilithium phosphate such as, for example, sodium acid phosphates, potassium phosphate, etc.

Instead of subjecting the trilithium phosphate to special treatment, we have found that it may be reintroduced into the system and recycled. As seen in our specific example in connection with ore treatment 1, by introducing the trilithium phosphate into the leaching tank, the calcium sulfate already present converted it to soluble lithium sulfate.

We will now explain the relation of our purification process to other types of ore treatment, giving a brief description of the ore treatments.

In ore treatment 2, a flow sheet of which may be seen in the drawing, a lithium bearing ore is digested with an excess of sulfuric acid and the resulting solution of lithium sulfate leached from the ore residue. Lime, as is customary, is then added to neutralize the excess sulfuric acid. This neutralization results in the formation of calcium sulfate. Also, by this ore treatment large amounts of aluminum sulfates, etc. are present.

Following the practice of our invention, the trilithium phosphate is then added, and the calcium sulfate, aluminum sulfate, etc. react with it to form soluble lithium sulfate and insoluble phosphates. The solution of lithium sulfate is filtered from impurities and then sent to my lithium purification process.

In the treatments of the type seen in ore treatment 3, water soluble compounds are used as calcining agents. For example, calcium chloride may be used. This process forms no part of the present invention and is fully disclosed in U. S. patent application Serial No. 707,610, filed January 20, 1934 by R. Pfanstiel and R. J. Kepfer.

After the ore is calcined with one of these agents, it is leached with water, and the solution separated from the ore residue. This solution may then be treated according to our purification process.

The trilithium phosphate recovered in the purification process may be recycled by adding it to the leaching tank.

Since the calcining agent is water soluble, it will be leached from the ore and will be contained in the solution treated by our purification process. We prefer, accordingly, to add the trilithium phosphate to the leached solution. For purposes of illustration the addition is shown as being immediately after the filter. Actually we usually add the trilithium phosphate to the carbonate precipitation tank prior to the addition of carbonate. We may or may not remove the precipitated phosphate from the impure lithium containing solution prior to the addition of carbonates.

When the trilithium phosphate is added to either step, the calcium chloride reacts with it to form soluble lithium chloride and insoluble calcium phosphate.

In ore treatment 4, water soluble compounds, such as sodium sulfate, sodium chloride, potassium sulfate, etc. are used. These agents differ from those used in ore treatment 3, as these will not react with trilithium phosphate to form soluble lithium salts.

According to this ore treatment, the ore is calcined with one of the calcining agents and the calcined mass is leached with water.

To the solution thus obtained we add trilithium phosphate recovered from the subsequent purification process. The impurities, such as the sulfates, chloride, etc. of iron, aluminum, manganese, etc., will react with the trilithium phosphate to form soluble lithium sulfate, chloride, etc. At the same time part, or all, of these impurities are precipitated as insoluble phosphates. If some trilithium phosphate remains, we may add the required amount of a salt which is more soluble than trilithium phosphate and which forms phosphates more insoluble than trilithium phosphate. Thus, we may add calcium, magnesium, aluminum, and heavy metal chlorides, sulfates, etc. to form soluble lithium compounds and insoluble phosphates of the added metals.

After the conversion of the lithium to soluble compounds we filter the solution from the precipitated phosphates and send it to our purification process.

It is not necessary that a separate tank and filter be used, as we may treat the trilithium phosphate in the leaching tank or in the carbonate precipitation tank of our purification process. When treating in the carbonate precipitation tank, the conversion to soluble lithium salts must take place prior to the precipitation of lithium as carbonate.

It is seen from the above discussion of various ore treatments that we may so correlate our improved purification process with various ore treatments as to permit the recycling of the recovered insoluble lithium compounds.

Instead of returning the recovered lithium compounds to the processes at the points above noted, we might simply add such lithium compounds to the ore to be treated. This modification is undesirable, however, because of the extra expense of drying and calcining the trilithium phosphate.

While we have described the use of our lithium purification in connection with certain specific ore treatments and with certain processes of recovering lithium, we do not intend to be limited thereby. The purification process may be practiced with lithium solutions obtained from any source, and without regard to the methods of lithium recovery.

The recovery and recycling of lithium, likewise, may be used with other processes of removing lithium compounds from solution.

We claim:

1. In a process of treating an impure solution containing a lithium compound, the steps comprising: jointly precipitating lithium carbonate and those impurities which form an insoluble precipitate with a carbonate reagent, separating the precipitate from the solution, and preferentially dissolving the lithium compounds from the impurities with an acid.

2. In a process of treating an impure solution containing a lithium compound, the steps comprising: adding an alkali metal carbonate to the solution to jointly precipitate lithium carbonate and those impurities which form insoluble basic compounds, separating the precipitate from the solution, and preferentially dissolving the lithium carbonate from the impurities with an acid.

3. In a process of treating an impure solution containing a lithium compound, the steps comprising: adding an alkali metal carbonate to the solution to jointly precipitate lithium carbonate and those impurities which form insoluble basic compounds, separating the precipitate from the solution, and preferentially dissolving the lithium carbonate from the impurities with hydrochloric acid.

4. In a cyclic process for the production of a lithium compound from a lithium bearing ore, wherein the ore has been treated to obtain an impure solution of a soluble lithium compound, the steps comprising: treating the impure solution to remove a lithium compound, treating the impure solution with a phosphate reagent to precipitate unrecovered lithium as trilithium phosphate, and returning the lithium phosphate to the process at a point where it will be converted to a soluble lithium compound.

5. In a cyclic process for the production of a lithium compound from a lithium bearing ore, wherein the ore has been treated to obtain an impure solution of a soluble lithium compound, the steps comprising: treating the impure solution to precipitate lithium as carbonate, separating the carbonate from the solution, treating the solution with a phosphate reagent to precipitate the unremoved lithium as trilithium phosphate, returning the trilithium phosphate to a point in the process prior to the said precipitation of a lithium compound, and reacting the trilithium phosphate with a metal salt more soluble than trilithium phosphate and which forms a phosphate less soluble than trilithium phosphate.

6. In a cyclic process for the production of a pure lithium compound from an impure solution of a lithium compound obtained by leaching a lithium bearing ore which has been calcined with a calcining agent which is more soluble than trilithium phosphate and which forms phosphates less soluble than trilithium phosphate, the steps comprising: treating the impure solution to jointly precipitate a lithium compound and such of the impurities present as form precipitates with soluble carbonates, separating the precipitate from the residual solution, preferentially dissolving the lithium salts from the precipitate with acid, treating the said residual solution with a phosphate reagent to recover unremoved lithium as trilithium phosphate, returning the recovered lithium to the process at a point prior to the precipitation of lithium as carbonate, and reacting the trilithium phosphate with a metal compound more soluble than trilithium phosphate and which forms a phosphate less soluble than trilithium phosphate.

7. In a cyclic process for the production of a pure lithium compound from a solution of a lithium compound which contains as impurities compounds of such metals as sodium, potassium, manganese, aluminum, and the like, and which solution was obtained by leaching a lithium bearing ore which has been calcined with a calcining agent more soluble than trilithium phosphate and which agent forms phosphates less soluble than trilithium phosphate, the steps comprising: separating lithium values from sodium and potassium compounds by adding an alkali metal carbonate to the solution to jointly precipitate lithium carbonate and those impurities which form insoluble basic compounds, separating the precipitate from the alkali metal compound solution, preferentially dissolving the lithium values from co-precipitated impurities with hydrochloric acid, treating the alkali metal compound solution with an alkali metal phosphate to precipitate unrecovered lithium values as trilithium phosphate, returning the recovered trilithium phosphate to the process at a point prior to the precipitation of lithium values as carbonate, and reacting the trilithium phosphate with a metal compound more soluble than trilithium phosphate and which forms a phosphate less soluble than trilithium phosphate.

8. In a cyclic process for the recovery of lithium values from a lithium bearing ore wherein the ore has been calcined with an ore treating agent comprising a calcium compound and wherein the calcined ore has been leached with water to obtain an impure solution of a soluble lithium compound, the steps comprising: treating the solution to remove a portion of the lithium compound therefrom, precipitating unremoved lithium as trilithium phosphate, and returning the lithium phosphate to a point in the process prior to a separation of the calcium compound from the solution.

HARRY P. CORSON.
ROBERT PFANSTIEL.